Patented Oct. 30, 1934

1,978,647

UNITED STATES PATENT OFFICE 1,978,647

METHOD FOR MAKING ALKALI METAL ALCOHOLATES

Edgar T. Olson, New York, N. Y., and Ralph H. Twining, Marquette, Mich., assignors to The Cleveland Cliffs Iron Company, Cleveland, Ohio, a corporation of Ohio No Drawing. Application November 6, 1931, Serial No. 573,518

7 Claims. (Cl. 260—156)

This invention relates to salts of alkali metals, and more particularly to sodium and potassium salts of mono, di and tri-hydric alcohols. The invention also relates to a new and improved method of making such salts.

Heretofore certain of the sodium salts of mono, di or tri-hydric alcohols, for example sodium ethylate, have been commercially made by treating anhydrous alcohol with metallic sodium. This method is quite costly and is apt to give a product which is lumpy, amorphous, and dirty in color.

According to the present invention, sodium and potassium salts, not only of ethyl alcohol but of the various mono, di and tri-hydric alcohols may be produced by an inexpensive process involving one or two steps. The salts so produced are in the form of very fine, anhydrous crystals which are pure white in color and are capable of being preserved for long periods of time without substantial discoloration. These salts do not have the disadvantages or objectionable features of the prior salts and hence are better adapted to the uses to which they may be put than the prior art salts.

As an example of one method, including two steps, by which the present invention may be practiced, a quantity of caustic soda is added to a quantity of ethyl alcohol, preferably greater in amount than is necessary to react with all the caustic soda. These two substances are either stirred until the reaction is complete or they may be heated in an apparatus provided with a reflux condenser until the action is completed. When the reaction has been completed, anhydrous acetone is added and precipitates the sodium ethylate as a finely divided, crystalline, anhydrous, pure white substance. This precipitated ethylate is filtered and is washed with a suitable substance such as gasoline or kerosene to dissolve and remove substantially all the acetone. Acetone may also be removed by drying in a closed vessel such as a still, with or without vacuum. The last traces of acetone may be removed by passing dry air or any dry, inert gas through the apparatus. In the event that material amounts of acetone remain with the ethylate, there is a tendency toward condensation of the acetone, due possibly to the catalytic action of the sodium ethylate, with resultant production of dark substances which tend to discolor the pure white ethylate.

As an example of the practicing of the present invention in a one-step operation, caustic soda, ethyl alcohol and anhydrous acetone may be mixed simultaneously. The reactions are substantially the same as have been described above in the two-step operation with the caustic soda and ethyl alcohol forming sodium ethylate which, as soon as it is formed, is precipitated by the acetone present to form the same crystalline, anhydrous, pure white sodium ethylate. Filtering separates the liquids from the precipitated ethylate and washing of the latter leaves the sodium salt in a form which has little or no tendency toward subsequent discoloration.

Although the foregoing examples have, for purposes of illustration, been restricted to a few certain substances it is to be understood that different substances can be employed together with, or in lieu of, such substances. For example, the ethyl alcohol of the examples may be replaced by any mono, di or tri-hydric alcohol, including methyl, propyl, or butyl alcohol, as well as all the other alcohols of this general group. The caustic soda mentioned in the examples may be replaced by the hydroxide of any of the elements of the alkali metal group. The acetone mentioned in the examples, may, in general, be replaced by any anhydrous substance which is capable of precipitating the salt and of dissolving water and the particular alcohol used, but incapable of dissolving the corresponding sodium or potassium salt. For example, mixtures of anhydrous acetone and butanol, or anhydrous acetone and gasoline, or anhydrous acetone and ethyl acetate, or anhydrous acetone and isopropylether or anhydrous acetone and benzol, as well as other ketones may be employed.

In the foregoing examples, gasoline and kerosene have been mentioned as illustrative of liquids suitable for washing the crystalline sodium salt produced by this invention but in general any washing liquid may be used with, or in lieu of, these substances so long as it is capable of dissolving the acetone, water and alcohol but is not capable of dissolving the precipitated salt. For example, petroleum oils, benzol, solvent naphtha, toluol, butyl alcohol, isopropylether or ether may be used for such washing purposes.

The foregoing specific disclosure of the present invention has been made so that those skilled in the art may be enabled to practice the same, and has not been made with the intention or expectation that the scope of the invention shall be limited to the details so disclosed, it being understood that non-inventive variations, alterations and changes in the foregoing disclosure may be made without departing from the scope of the invention as set forth in what is claimed.

What is claimed is:

1. The method of making sodium salts which comprises mixing caustic soda and an aliphatic alcohol to form a liquid, adding anhydrous acetone to the mixture and separating the precipitated sodium salt from the liquid.

2. The method of making sodium salts which comprises precipitating a sodium salt from a liquid containing a mixture of caustic soda and an aliphatic alcohol, separating the precipitated sodium salt from the liquid and washing the filtrate with an anhydrous liquid capable of dissolving water, caustic soda, and the said alcohol, but incapable of dissolving the sodium salt.

3. The method of making sodium ethylate which comprises forming a liquid containing a mixture of caustic soda and ethyl alcohol, precipitating sodium ethylate by means of anhydrous acetone, filtering the precipitate and washing it with an anhydrous liquid incapable of dissolving the sodium salt but capable of dissolving the other ingredients of the liquid in which the precipitate was originally formed.

4. The method of making potassium salts which comprises mixing caustic potash and an aliphatic alcohol to form a liquid, adding anhydrous acetone to the mixture and separating the precipitated potassium salt from the liquid.

5. The method of making potassium salts which comprises precipitating a potassium salt from liquid containing a mixture of caustic potash and an aliphatic alcohol, separating the precipitated potassium salt from the liquid and washing the filtrate with an anhydrous liquid capable of dissolving water, caustic potash, and the said alcohol, but incapable of dissolving the potassium salt.

6. The method of making potassium ethylate which comprises forming a liquid containing a mixture of caustic potash and ethyl alcohol, precipitating potassium ethylate by means of anhydrous acetone, filtering the precipitate and washing it with an anhydrous liquid incapable of dissolving the potassium salt but capable of dissolving the other ingredients of the liquid in which the precipitate was originally formed.

7. The method of making alkali metal salts which comprises mixing the alkali metal hydroxide and an aliphatic alcohol to form a liquid, adding anhydrous acetone to the mixture and separating the precipitated alkali metal salt from the liquid.

EDGAR T. OLSON.
RALPH H. TWINING.